US012272951B2

(12) United States Patent
Biswas et al.

(10) Patent No.: US 12,272,951 B2
(45) Date of Patent: Apr. 8, 2025

(54) SEVERE WEATHER-DRIVEN LARGE-SCALE OUTAGE MANAGEMENT FOR EMERGENCY POWER GRID

(71) Applicant: GENERAL ELECTRIC COMPANY, Schenectady, NY (US)

(72) Inventors: Saugata Swapan Biswas, Kirkland, WA (US); Tushar, Bothell, WA (US); Arvind Mallikeswaran, Bothell, WA (US); Pradeep Kumar Manigilla, Bothell, WA (US); Srinivas Musunuri, Redmond, WA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/723,639

(22) Filed: Apr. 19, 2022

(65) Prior Publication Data

US 2024/0097446 A1    Mar. 21, 2024

(51) Int. Cl.
    *H02J 3/00*     (2006.01)
    *H02J 3/14*     (2006.01)
    *H02J 13/00*    (2006.01)

(52) U.S. Cl.
    CPC .......... *H02J 3/14* (2013.01); *H02J 13/00001* (2020.01); *H02J 13/00002* (2020.01); *H02J 2310/62* (2020.01)

(58) Field of Classification Search
    None
    See application file for complete search history.

(56) References Cited

U.S. PATENT DOCUMENTS

| 2019/0260230 A1 | 8/2019 | Biswas et al. |
| 2020/0066139 A1* | 2/2020 | Ogden .................. G01V 1/306 |
| 2020/0150706 A1* | 5/2020 | Moosvi .................. G06F 1/263 |

OTHER PUBLICATIONS

Karagiannis et al., "Power Grid Recovery After Natural Hazard Impact", 2-17,JRC Science For Policy Report, European Commission, pp. 6, 7, 26 and 39 (Year: 2017).*

* cited by examiner

*Primary Examiner* — Paul B Yanchus, III
(74) *Attorney, Agent, or Firm* — Buckley, Maschoff & Talwalkar LLC

(57) ABSTRACT

Provided is a system and method that can safely generate and execute an outage plan for a power grid based on severe weather-driven events. In one example, the method may include receiving predicted or current operational power system state data from a power grid and weather conditions associated with the power grid, identifying one or more nodes on the power grid to de-energize based on the operational state data and the current weather conditions, determining a sequence of instructions to perform to de-energize the one or more identified nodes based on the operational state data and the current weather conditions associated with the power grid, and generating an outage plan including mitigation steps for ensuring the stability and security of the power grid which includes the determined sequence of instructions to be executed and store the outage plan in the memory.

20 Claims, 14 Drawing Sheets

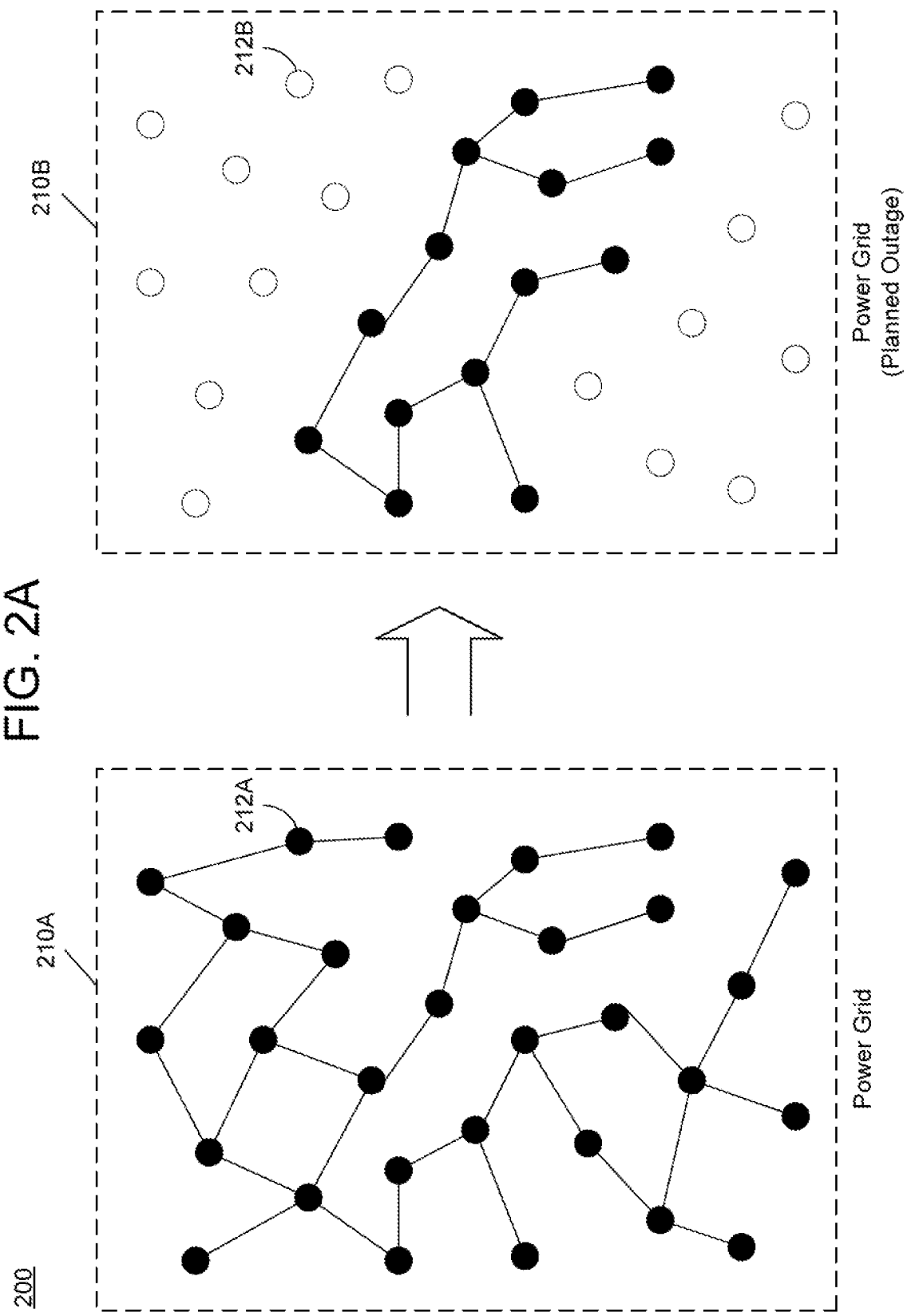

FIG. 2C

250 Initial Outage Plan

1) Node # 30112
2) Node # 42099
3) Node # 34452
4) Node # 29472
5) Node # 32058
6) Node # 33494
...

+

260 Mitigation Plan

~~3) Node # 34452~~

3A) Node # 34110
3B) Node # 34109

=

280

270 Outage Plan

1) Node # 30112
2) Node # 42099
3A) Node # 34110
3B) Node # 34109
4) Node # 29472
5) Node # 32058
6) Node # 33494
...

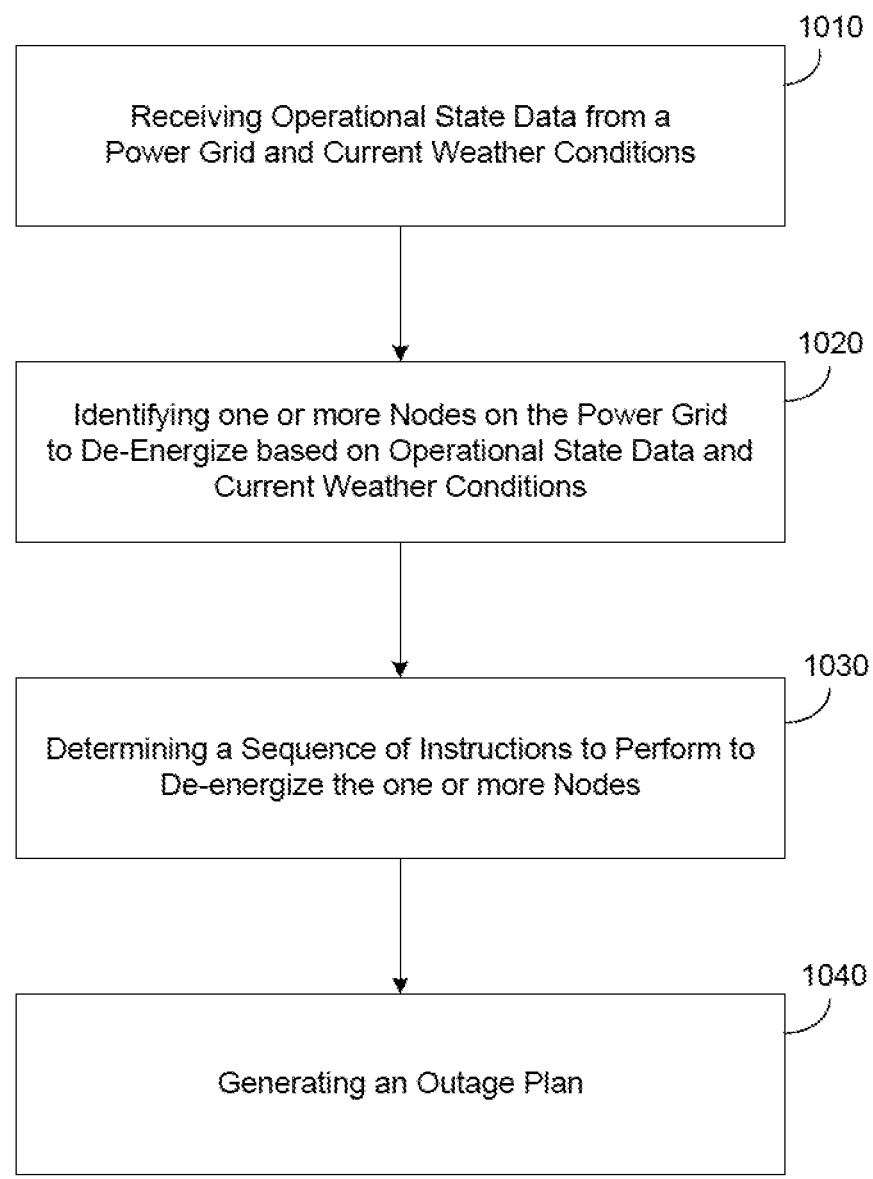

SEVERE WEATHER-DRIVEN LARGE-SCALE OUTAGE MANAGEMENT FOR EMERGENCY POWER GRID

BACKGROUND

Due to its complexity and dynamicity, a power grid is typically a difficult system to manage. Often times, the power grid can comprise numerous assets such as power grid devices and a complex system of transmission lines. Furthermore, a power grid is often integrated with other power grids, resulting in a large-scale power grid system. Maintenance and other issues are commonly performed on the power grid to ensure its operating stability. To perform such maintenance, a "planned" power outage may be performed by the power company such as an operator in a control center. Planned power outages are deliberate decisions to cut power supplied to the power grid thereby causing consumers to lose power. A planned power outage can be based on an outage plan that is generated by an operator of the power grid.

Typically, an operator uses their first-hand experience and knowledge to make decisions on which nodes to de-energize within the power grid, and in which order, to create the outage plan. This information is usually based off of the current and/or historic operating conditions of the power grid. However, for threats to the power grid that are not very familiar to a grid operator, such as severe weather-driven events (e.g., hurricanes, wildfires, earthquakes, tornadoes, etc.), the grid operator typically doesn't have much experience. In these situations, the grid operator often creates an excess of outages that are unnecessary, in an abundance of caution. However, in doing so, the operator unnecessarily leaves the power grid with additional instability and risk.

SUMMARY

The example embodiments are directed to a system that can automatically generate an outage plan for a power grid based on current operating state of the power grid (e.g., steady-state and dynamic-state conditions, etc.) and based on current weather conditions in the area/environment that includes the grid. For example, the current weather conditions may include geospatial data identifying the location of the weather event(s), wind speed, wind direction, temperature, and other attributes. Various models can be used to determine an initial outage plan based on the operating state of the grid, the weather conditions, any critical loads, crew data sent back from the field, etc. This information can be analyzed by the models and used to generate an initial outage plan.

The system may also simulate the initial outage plan against the operating state of the power grid, for example, power system models, etc. Here, the system may also analyze the results of the simulation and identify any instructions in the initial outage plan that can create potential instability (e.g., load-generation imbalance, voltage instability, line overflows, voltage violations, etc.). here, the system can generate one or more mitigating steps to perform to ensure that the outage plan can maintain stability within the power grid in lieu of the potential instability. This process can be performed in real-time with the process of generating the outage plan. The system may then incorporate (e.g., add, embed, etc.) the mitigating steps into the initial outage plan to create a final outage plan that can then be executed by a control center.

In an aspect of an example embodiment, provided is a computing system that may include a memory, a network interface configured to receive operational state data from a power grid and current weather conditions associated with the power grid, and a processor configured to one or more of identify one or more nodes on the power grid to de-energize based on the operational state data and the current weather conditions, determine a sequence of instructions to perform to de-energize the one or more identified nodes based on the operational state data and the current weather conditions associated with the power grid, and generate an outage plan for the power grid which includes the determined sequence of instructions to be executed and store the outage plan in the memory.

In another aspect of an example embodiment, provided is a method that may include receiving operational state data from a power grid and current weather conditions associated with the power grid, identifying one or more nodes on the power grid to de-energize based on the operational state data and the current weather conditions, determining a sequence of instructions to perform to de-energize the one or more identified nodes based on the operational state data and the current weather conditions associated with the power grid, and generating an outage plan for the power grid which includes the determined sequence of instructions to be executed and store the outage plan in the memory.

In another aspect of an example embodiment, provided is a non-transitory computer-readable storage medium, which may include instructions for a method that may include receiving operational state data from a power grid and current weather conditions associated with the power grid, identifying one or more nodes on the power grid to de-energize based on the operational state data and the current weather conditions, determining a sequence of instructions to perform to de-energize the one or more identified nodes based on the operational state data and the current weather conditions associated with the power grid, generating an outage plan for the power grid which includes the determined sequence of instructions to be executed and store the outage plan in the memory, followed by actual execution of such outage plan(s) in the Power Grid using SCADA Controls, that are sent to change the status of circuit breakers in the Substations.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating examples of generating an outage plan based on weather conditions in accordance with example embodiments.

FIG. 10 is a diagram illustrating a method of generating an outage plan for a power grid based on weather conditions in accordance with an example embodiment.

Figure 1:
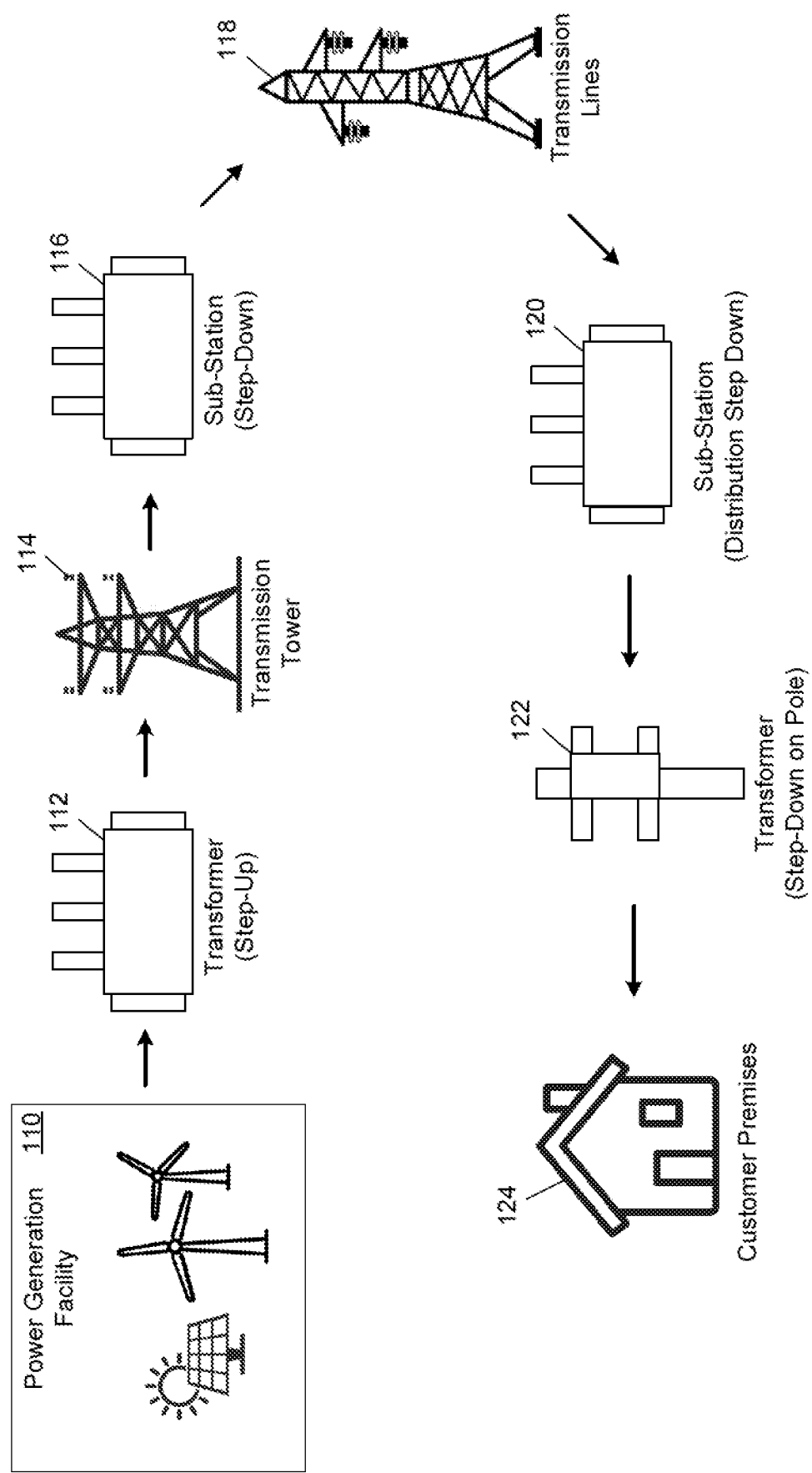
FIG. 1 is a diagram illustrating a power system for distributing electricity to a customer in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Growing climate change has led to occurrence of severe weather conditions like wildfires, hurricanes, tornados, etc. across the globe. Power companies will often address such weather conditions with large-scale preemptive power outages to a power grid for public safety. For example, power outages may prevent short-circuit faults that can cause or spread wildfires. Manually creating the most optimal outage plans for these scenarios can be highly time-consuming and challenging because of the dynamic location (i.e. spread) of the weather event and intensity of the weather conditions. These dynamic features also make it difficult on grid operators to ensure that all along the implementation of such outages, power grid stability and security is maintained. This is often because a grid operator is in a scenario that they have not seen before or have not seen very much of.

The example embodiments are directed to a software application that can autogenerate an optimal outage plan for a power grid in a few seconds or less which includes a list of power system equipment to be shut down and the order/instructions for shutting down the power equipment. The software can also simulate the outage plan and predict potential adverse effects as a result of the outage plan, such as load-generation imbalance, voltage and frequency instability, system violations, etc., and determine a mitigation plan to mitigate such potential adverse effects which can be incorporated into the outage plan. Furthermore, the outage may be executed, for example, by the software application described herein to automatically shut down various nodes on the power grid in response to the instructions in the outage plane.

The example embodiments include novel algorithms for auto-generation of node-breaker based operational outage plans, along with mitigation plans, for secured operation of the power grid during a severe-weather driven emergency. The algorithms may be part of the software application and may identify the nodes to de-energize (e.g., shutdown, etc.) based on the state of the power grid and the weather conditions associated with the power grid. In particular, the algorithms may consider the geo-spatial location of attributes of the weather (e.g., wind speed, wind direction, location, temperature, etc.) and use this information to plan a shutdown of the power grid in a manner that safely de-energizes the grid in view of the location of the weather-driven event and mitigates any potential adverse effects caused by such shutdowns.

The outage plan can be archived digitally and validated from both steady state and dynamic predictive analysis perspective before being deemed fit for actual execution. As a part of the validation of the outage plan, the operational sequence of the steps may be automatically analyzed by an automated analysis module referred to as an Autopilot which can insert additional steps in the original outage plan based on the grid stability and security requirements, in the correct sequence. After predictive validation, the enhanced outage plan (including such additional steps) can be loaded onto a real-time counterpart of the Autopilot which can help in the execution of the outage plan, for example, via a control center and SCADA controlled devices on the grid. The example embodiments can help make complex emergency operations of the power grid (such as large-scale outages and restoration) much more reliable, secured, and cost-effective than ever-before in lieu of weather-driven emergency events such as hurricanes, earthquakes, wildfires, and the like.

FIG. 1 illustrates a power delivery system 100 showing components that can facilitate the generation of power and the process of delivering power (e.g., delivering energy, electricity) to customer premises 124. Electric power can be generated at a power generation facility 110, passed to a transformer 112 and then carried by transmission lines 114 to substations 116 having transformers. A local distribution system of smaller, transmission lines 118 (which may be lower voltage than transmission lines 114) and substations 120 and 122 carry power to the customer premises 124. In the example of FIG. 1, the power generation facility 110 can generate electric power which is passed to a point on the grid (e.g., substation 116, etc.) and carried to the customer premise 124.

A variety of facilities can generate electric power including both power plants and renewable energy sources. For example, power generation facility 110 can include power plants that burn coal, oil, or natural gas. As another example, power generation facility 110 can include nuclear power plants, renewable sources of energy such as hydroelectric dams, wind turbines, solar panels, and the like. The location of these power generation facilities, and their distance from end users, can vary widely.

The electricity that is generated by the power generation facilities may be stepped up or stepped down by transformers (e.g., transformer 112) which may be located at power plant substations adjacent to (and connected via power lines to) the power plant. For example, a transformer may be a step-up transformer that will "step up" the voltage of the electricity. When power travels through power lines (e.g., metallic wires that conduct electricity), some of that power is wasted in the form of heat. The power loss is proportional to the amount of current being carried. Power companies keep the current low and compensate by stepping up the voltage. After the voltage is stepped up, the electricity is typically carried over long distances by high voltage power transmission lines, typically supported and elevated by transmission towers (e.g., transmission lines 114 and 118) that can be of various dimensions, materials, and heights.

The voltage may be gradually reduced by step-down transformers as the electricity approaches customer premises. Transmission substations contain step-down transformers that reduce the voltage of the electricity. The electricity can then be distributed on lower-voltage power lines. A typical transmission substation can serve tens of thousands of customers. The electricity leaving transmission substations can travel through power lines to distribution substations. Distribution substations contain step-down transformers that further reduce the voltage of electricity and distribute the power with distribution, or branch, lines running through urban and rural areas. Distribution lines carry lower voltage power to clusters of homes and businesses, and are typically supported by wooden poles. Of note, power lines can also be buried under the ground. Of note, substations can contain a variety of other equipment, including switches, breakers, regulators, batteries, etc.

The voltage from a branch line can further be reduced by transformers that are mounted on poles that connect customer premises through a service drop power line. Customer premises (e.g., customer premise 124, etc.) can be of any type and variety. Customer premises can be a residential customer premises, such as residential houses. Customer premises can be an industrial customer premises, such as factories. Customer premises can be commercial customer premises, such as an office building. If a particular customer premises has a heavier load (e.g., has a higher demand for power), then a larger transformer, instead of a pole transformer, might service that particular customer premises.

FIG. 2A illustrates a process 200 of performing an outage to a power grid 210A based on an automatically generated outage plan according to example embodiments. Referring to FIG. 2A, the power grid 210A (e.g., an electrical grid) includes multiple nodes (such as node 212A) disposed therein. In this example, a node may represent a power generation facility, transmission substation, a distribution substation, and the like, and is intended to convey that such facilities and substations can be interconnected. In the examples herein, a node may be referred to as a "power system node." The power grid 210A can follow a structural topology, influenced by factors such as budget, system reliability, load demand (demand for power), land, and geology. The structure of the medium to high voltage transmission grid typically tends to follow a classic meshed topology, whereas the relatively lower voltage distribution grid feeding power to many cities and towns, for example many of those in North America, tends to follow a classic radial topology. This is a tree-shape network wherein power from larger voltage lines and substations radiates out into progressively lower voltage lines and substations until the customer premises are reached.

A substation receives its power from a power generation facility, and the power may be stepped down with a transformer and sent through lines that spread out in all directions across the countryside. These feeders carry three-phase power and tend to follow major streets near the substation. As the distance from the substation grows, the fanout continues as smaller laterals spread out to cover areas missed by the feeders. This tree-like structure grows outward from the substation, but a single power failure can render inoperable entire branches of the tree. For reliability reasons, there are often unused backup connections from one substation to a nearby substation. This backup connection can be enabled in case of an emergency, such that a part of a substation's service area can be fed by another substation in case of any power failure events. Redundancy allows line failures to occur and power to be rerouted while workmen restore to service damaged or deactivated components. Neighboring power utilities also typically link their grids, thereby assisting one another to maintain a balance between power generation supply and loads (e.g., customer demand).

The result can be an interconnected power grid system that can form complex networks of power plants and transformers connected by hundreds of thousands of miles of high-voltage transmission lines. While these interconnections can be useful in situations, the danger or risk can comprise the possibility that a shutdown in one sector could rapidly spread to other sectors, leading to massive power failures in a wide area.

In the example of FIG. 2A, disposed within the power grid 210A are measurement devices (not shown). Throughout a power network, a variety of sensors, monitoring devices and measurement devices (collectively referred to herein as "measurement devices") can be located at one or more nodes, in between nodes on lines, and the like, and can be used to provide monitoring data related to power flow measurements, or monitor the condition of one or more aspects of a power grid system. The measurement devices may be deployed within, or adjacent to, power transmission components (e.g., generating units, transformers, circuit breakers), including at substations. In some examples, the measurement devices can also be deployed along distribution lines.

The measurement devices may include sensors that measure a range of parameters such as magnitude and phase angle of voltage, current, harmonic distortion, real and reactive power, power factor, and fault current. Examples of some sensors include, but are not limited to, voltage and current sensors, PMUs, transformer-Metal Insulated Semiconducting (MIS) gas in oil sensors, circuit breaker sulfur hexafluoride density sensors, conductor temperature and current sensors that record overhead transmission conductor temperatures and current magnitudes, overhead insulator leakage current sensors, Transmission Line Surge Arrester (TLSA) sensors, and the like.

In the example of FIG. 2A, the power grid 210A is powered down to the powered down power grid 210B in response to execution of an outage plan. The outage plan may be automatically created based on the examples further described herein. The outage plan may include a sequence of instructions which, when executed by a control center, may cause one or more nodes on the power grid 210A to power down until the powered down power grid 210B is achieved. In this example, some nodes remain powered on while other nodes (such as node 212A) is powered off (and is now powered-off node 212B) based on weather events. In particular, the host system described herein (e.g., a software application executed by a control center that is in communication with an emergency management system (EMS) of a power grid, etc.) may determine an outage plan including a sequence of instructions for shutting down a portion of the power grid based on geospatial location data of a weather event such as a storm, an earthquake, a wildfire, or the like.

Figure 2B:
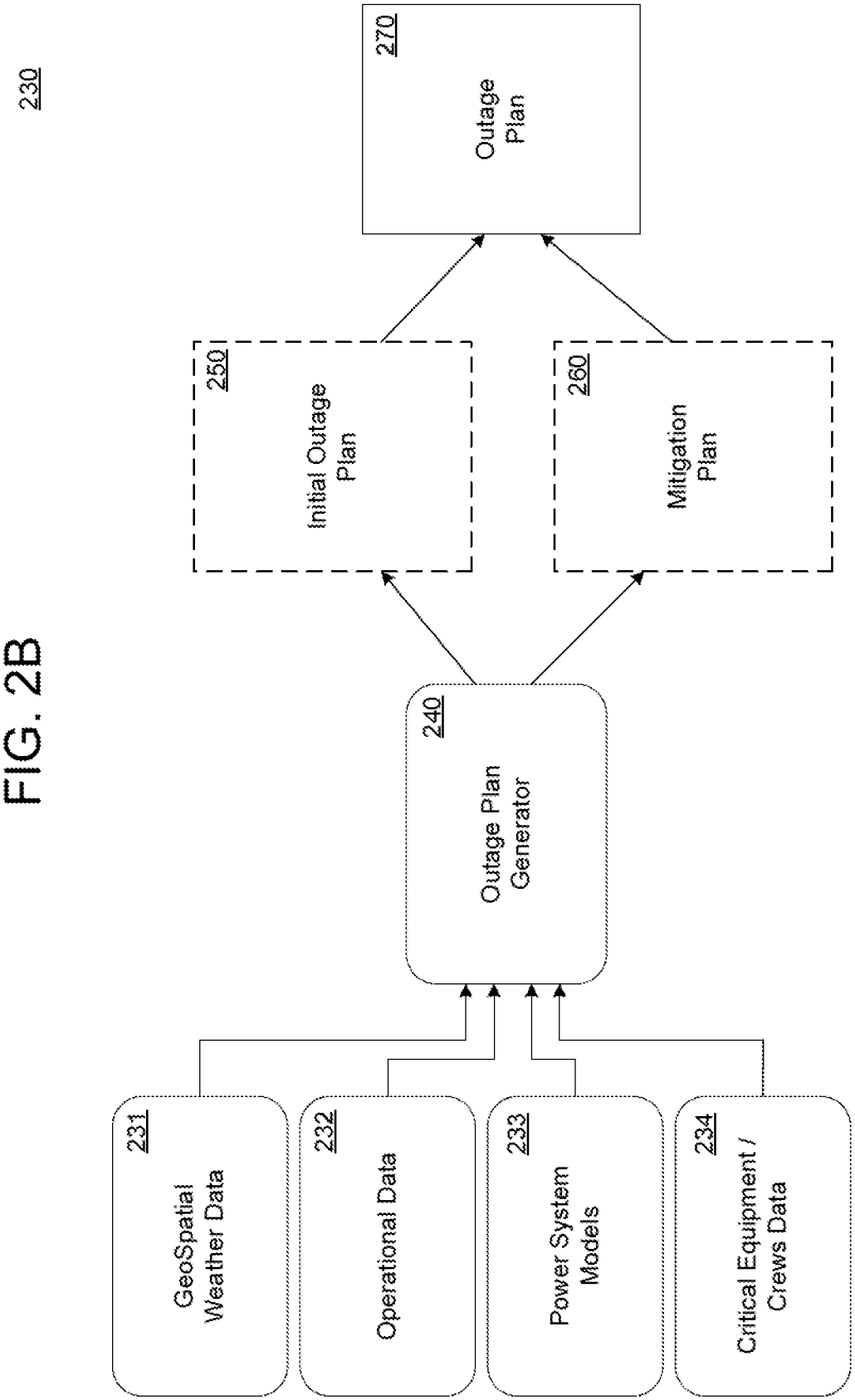

FIG. 2B illustrates a process 230 of generating an outage plan for a power grid based on weather conditions in accordance with an example embodiments. Referring to FIG. 2B, weather data 231 may be collected from one or more weather-related sources such as live secured websites, web feeds, and the like. The weather data may include weather conditions such as temperature, wind speed, wind direction, geospatial locations of whether data and weather events, and the like. The weather data 231 may include current weather attributes and/or forecasted weather attributes that are predicted to occur in the future using forecasting models.

As noted above in FIG. 2A, measurement devices on the power grid can be used to obtain, monitor or facilitate the determination of electrical characteristics associated with the power grid system (e.g., the electrical power system), which can comprise operational state data 232 of the power grid, for example, power flows, voltage, current, harmonic distortion, frequency, real and reactive power, power factor, fault current, and phase angles. Measurement device can also be associated with a protection relay, a Global Positioning System (GPS), a Phasor Data Concentrator (PDC), communication capabilities, or other functionalities. The operational data 232 may be stored and held in memory and used by the software application described herein.

In addition, one or more power system models 233 may be obtained which includes power systems data, network topology, and the like. In addition, additional data 234 may be included such as critical equipment that may or may not be available for operation for de-energizing the weather prone areas. Other additional data 234 may include messages and notes uploaded from service members on the ground and in the field with information about the weather, the lines that are down, etc.

According to various embodiments, the host system described herein may include an outage plan generator 240 that includes various models for generating an outage plan for a power grid. Here, the outage plan generator 240 may receive the weather data 231, the operational state data 232, the one or more power system models 233, the additional data 234, etc. and generate and validate an outage plan 270 in response. The outage plan 270 may be created based on a combination of geospatial weather event information included in the weather data 231 and geospatial location data of nodes on the power grid.

Furthermore, the outage plan generator 240 may validate the model against various test cases or base cases to ensure that the power grid will maintain a particular level of stability while partially powered down. For example, the outage plan generator may simulate the initial outage plan 250 against the power grid to identify excessive load shedding or other adverse results. The outage plan generator 240 may generate a mitigation plan 260 based on the simulation which includes instructions to address the excessive load shedding and to prevent it. These instructions are then integrated with the initial outage plan 250 to generate the outage plan 270 that can be executed.

The outage plan generator 240 may include a novel algorithm that performs automated power system network search to find an appropriate or minimum number of nodes (e.g., circuit breakers, etc.) that would be needed to completely de-energize all the power system equipment that may be deemed unsafe for live operation under severe weather conditions. This is manifested in the form of an outage plan, which includes a list of sequential steps in operational node-breaker format. The algorithm can take into consideration the circuit breaker (CB) type as may be preferred by the user, for instance, try to use SCADA-controlled CBs over manually switched ones to the extent practically feasible, so as to enable remote operation from the Grid Control Center rather than deploying crew in substations, thereby increasing operational speed and operational safety.

This process ensures guaranteed complete de-energization of the required list of equipment at high risk due to severe weather conditions using optimal combination of circuit breakers. This can potentially eliminate the risk of live electrical equipment leading to start or spread of fire due to short circuits during severe weather conditions, and at the same time not resulting in excessive load shed due to excessive outages.

The speed of the auto-generation of the outage plan can make the adaptation of plans to fast changing weather conditions possible. The current/conventional practice of manual creation and validation of such outage plans is extremely time consuming (e.g., approximately 1,000 times slower than that of the example embodiments, etc.) and very challenging. Furthermore, there is always a high possibility of not updating the grid in real-time, thereby leading to either not performing the necessary outages or performing more excessive outages than required.

Furthermore, the outage plan generator 240 also includes a novel algorithm that can solve power system island infeasibility/stability issues that may occur due to an outage plan. For example, simulated results of the outage plan can be generated and analyzed to create a mitigation plan that attempts to create a proper balance between load and generation so as to maintain island frequency stability and thereby make it feasible, if practically possible using the resources available in the island. However, if the required resources are not available in the island to sustain it, then this algorithm can then create a plan that lists out the steps to safely de-energize the island. The outage plan generator 240 also includes a novel algorithm to autogenerate mitigation plans to help sustain the island with outage plans being put in place to not only ensure power system stability and security during the execution of the Outage Plan, but also help reduce excessive load shed due to unnecessary complete island de-energization.

Furthermore, the outage plan generator 240 may include a novel algorithm that is integrated into an automated incremental steady state plan validation that is performed by a software program referred to as the autopilot. It can perform base case and post-contingent predictions at step-by-step level or milestone-by-milestone level (where, milestone refers to a group of steps) of the outage plan, and automatically create an outage plan on the fly to mitigate stability or security issues that may be encountered at any stage of such intermediate predictions.

The autopilot may also include another novel algorithm that can perform dynamic analysis by interacting with the dynamics simulation engine internally to ensure that outage plans are feasible from a power system dynamics perspective. It can also perform steady state base case and post-contingent predictions in real-time prior to actual execution of plan step controls through SCADA. The base case and post-contingent predictions can be generated using machine learning models or the like, and can then be used as a basis for mitigating the outages that are suggested by the outage plan.

FIG. 2C illustrates a process 280 of generating the outage plan 270 from the initial outage plan 250 and the mitigation plan 260 of the power grid. Here, the initial outage plan had a third step that was determined to be excessive load shedding that can be mitigated by replacing it with the two instructions in the mitigation plan 260. Thus, the outage plan 270 includes a modification to the initial outage plan 250 based on the mitigation plan 260.

Figure 3:
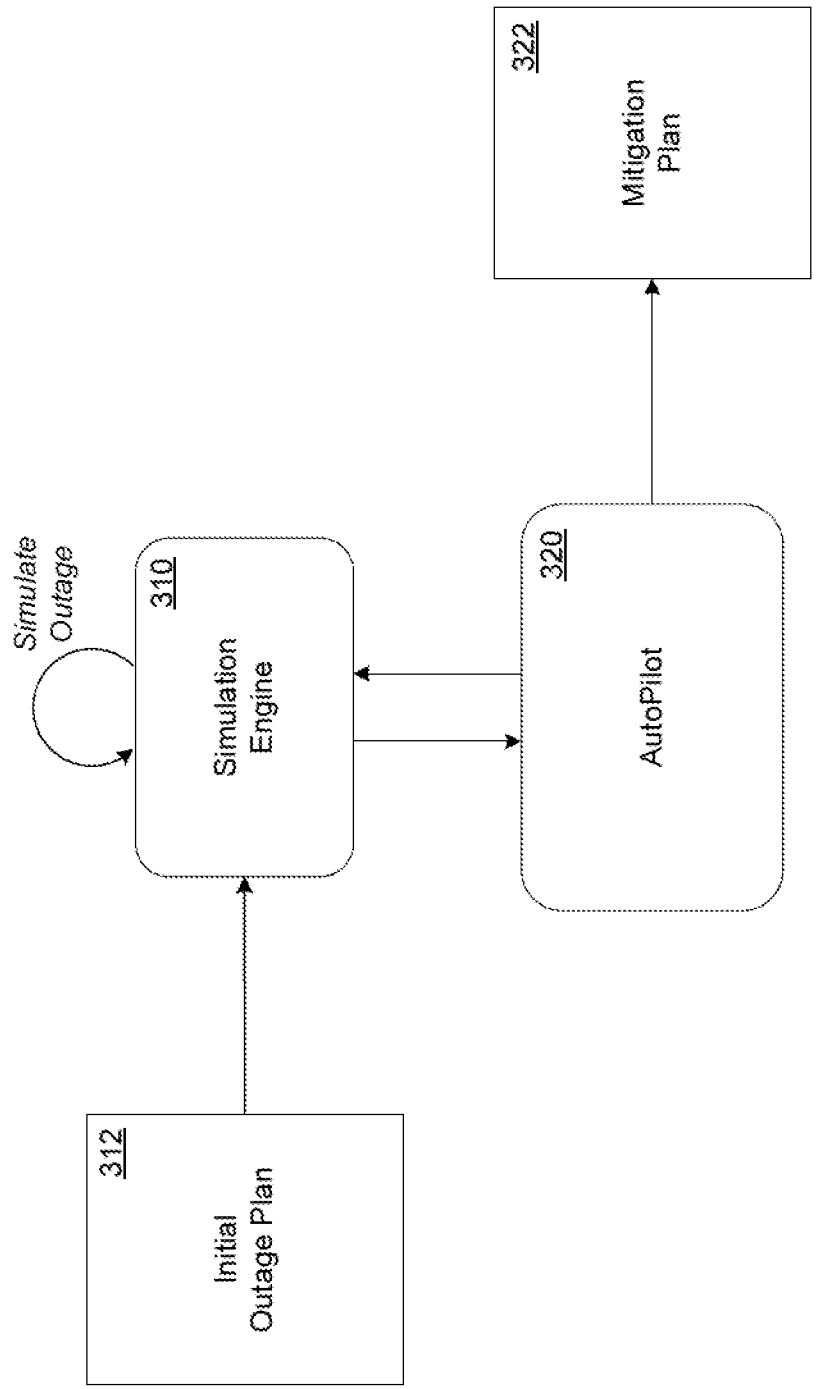
FIG. 3 is a diagram illustrating a process of validating an initial outage plan and generating a mitigation plan in accordance with an example embodiment.

FIG. 3 illustrates a process 300 of validating an initial outage plan 312 and generating a mitigation plan 322 in accordance with an example embodiment. Referring to FIG. 3, the host system described herein may include a simulation engine that can be used to simulate the results of a power outage based on the initial outage plan 312 (such as the initial outage plan 250 in FIG. 2B). Here, the host system may initiate or otherwise send a call or request to a simulation engine 310 to simulate the initial outage plan 312. The simulation engine 310 may execute computer-readable instructions within the initial outage plan 312 to simulate a shutdown of nodes on the power grid thereby creating a simulated powered down grid. The host system (e.g., autopilot 320) may identify an excessive load shedding based on the simulation and create the mitigation plan 322 to include mitigation instructions for reducing or otherwise preventing the excessive load shedding when the final outage plan is actually executed.

For example, the outage plan described herein may be executed by the autopilot 320 which is coupled to or otherwise in communication with a Supervisory Control and Data Acquisition (SCADA) system (e.g., SCADA component). Voltage and current magnitudes can be measured and reported to a system operator every few seconds by the SCADA component. The SCADA component can provide functions such as data acquisition, control of power plants, and alarm display. The SCADA component can also allow operators at a central control center to perform or facilitate management of energy flow in the power grid system. For example, operators can use a SCADA component (for example using a computer such as a laptop or desktop) to facilitate performance of certain tasks such as opening or closing circuit breakers, or other switching operations that might divert the flow of electricity.

In some examples, the SCADA component can receive measurement data from Remote Terminal Units (RTUs) connected to sensors in the power grid system, Programmable Logic Controllers (PLCs) connected to sensors in the power grid system, or a communication system (e.g., a telemetry system) associated with the power grid system.

The SCADA component can also be associated with a system for monitoring or controlling devices in the power grid system, such as an Energy Management System (EMS). An EMS can comprise one or more systems of computer-aided tools used by operators of the electric power grid systems to monitor, control, and optimize the performance of the generation or transmission system. Often, an EMS is also referred to as SCADA/EMS or EMS/SCADA. In these respects, the SCADA/EMS or EMS/SCADA can also perform the functions of a SCADA. Or, a SCADA can be operable to send data (e.g., SCADA data) to the EMS.

Figure 4:
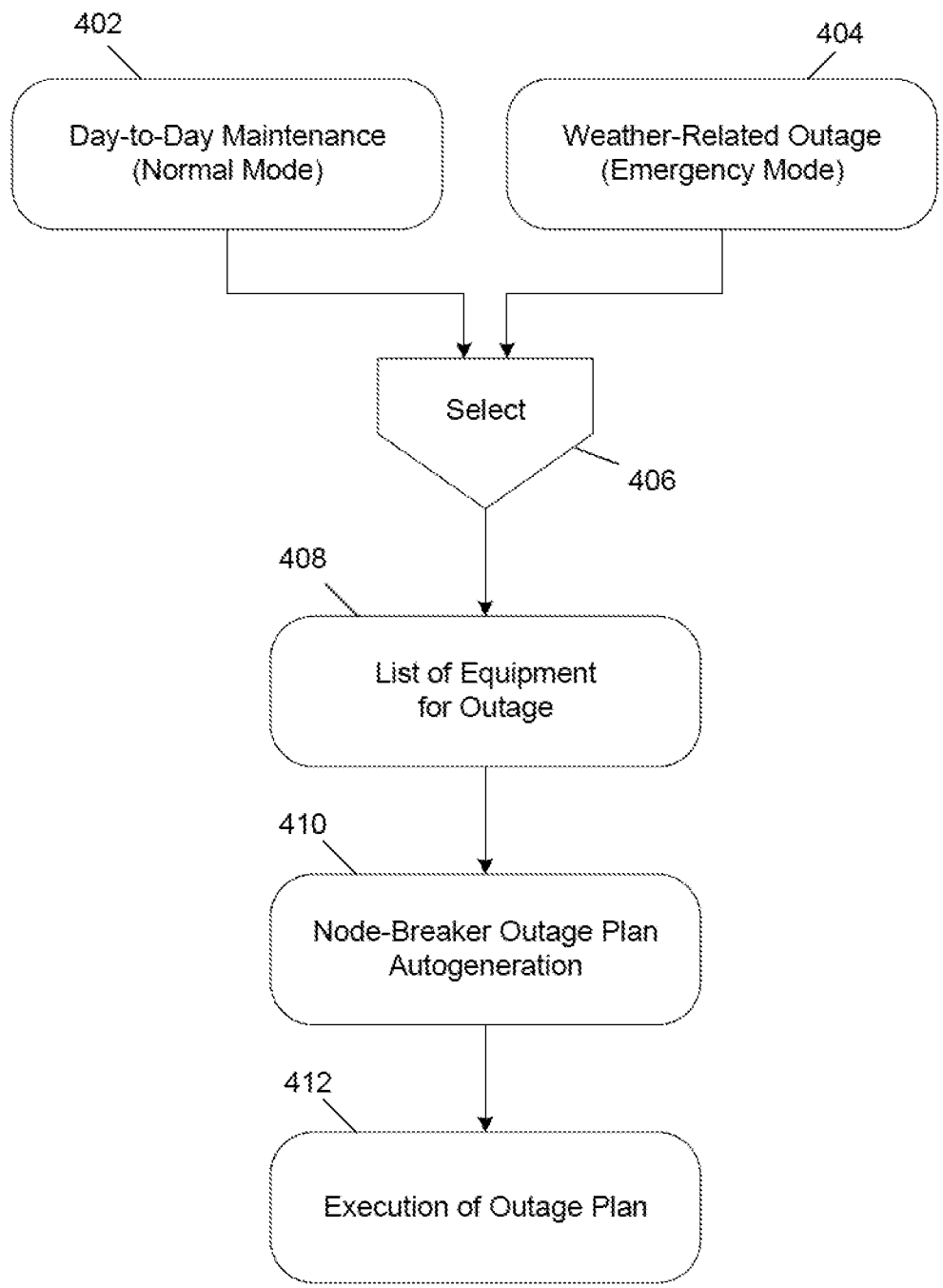
FIG. 4 is a diagram illustrating a process of generating and executing an outage plan based on a severe weather forecast in accordance with example embodiments.

FIG. 4 illustrates a process 400 of generating and executing an outage plan based on a severe weather forecast in accordance with example embodiments. Referring to FIG. 4, the host system described herein may be coupled to or otherwise integrated with an energy management system. In 402, the system may receive day-to-day data of the equipment within a power grid. The day-to-day information may include normal maintenance, outage, restoration, and the like. In 404, the system may receive weather-related outage data such as a weather forecast for a future period of time such as the next hour, the next day, the next 48 hours, etc. In 406, the system may identify a list of transmission lines that are prone to weather related threats like wildfire or storms based on geographical attributes and timing attributes of a predicted weather forecast.

Apart from the set of transmission lines that are prone to severe weather conditions, there could be equipment that is scheduled for maintenance or that is being brought back into service after maintenance. Such equipment data should also be considered by the system when performing large-scale outage studies in an Energy Management System (EMS). Accordingly, in 406, the host may consider both the day-to-day outage/maintenance data received in 402 and the weather forecast data in 404, and determine the list of equipment to be outaged based on the combination of data. Once the list of equipment to be outaged due to severe weather conditions is finalized, in 408, the list may be sent as an input to a novel outage management module. In 410, the outage management module may autogenerate a node-breaker based outage plan to completely de-energize all the equipment included in the list. This autogenerated outage plan can then further be studied and analyzed for any violation or stability issues and sent for execution in the field or to an EMS system or the like, in 412.

For example, the finalized list of equipment for outage (based on severe weather conditions) may be input to the node-breaker based outage plan auto-generation module. While identifying circuit breakers to de-energize all the equipment in the outage list, it is important that these outages are precise and surgical (i.e., ensure complete de-energization and minimize additional indirect outages of loads) in nature. The outages which are scheduled to be performed at a particular time need to be executed as fast as possible to avoid any further weather-related repercussions. Thus, the system operators would typically prefer SCADA-controlled circuit breakers to de-energize equipment in the Outage list.

The outage management module may include various user-specified objectives, criteria and constraints that can be taken into account while autogenerating node-breaker based outage plan(s) with examples described herein. As an example, the objectives may include one or more of the following, but are not limited thereto. As an example, an objective may include min f(CB), where, f(CB) is the Total Number of Circuit Breaker Operations needed for complete de-energization of the required list of equipment and CB∈{All CBs in the network}. As another example, an object may include max f(P: CB), where, f(P: CB) refers to a total number of circuit breakers in the operational outage plan with preferred circuit breaker type (e.g., SCADA controlled circuit breaker type for remote control) where preferred CB Type∈{CB Type$_1$, CB Type$_2$, CB Type$_3$ . . . . CB Type$_n$.

Examples of the criteria may include, but are not limited to, isolation search at station-level, isolation search at node-level, include/exclude all segments of a transmission line for de-energization, consider current status of breakers.

Examples of constraints include, but are not limited to, an equipment unavailable list CB'∈{CB}−{Unavailable Equipment}. Here, for example, the equipment may include transmission lines, transformers, circuit breakers, and the like, which may be unavailable due to maintenance, operational failure, SCADA tagging, crew inspection inputs, etc.

In some embodiments, the system autogenerates a node-breaker based outage plan to de-energize all the equipment in outage list. The next step is to perform a predictive steady state assessment of the outage plan. It is important to maintain the law of conservation of energy at individual bus and for the system as a whole at each step of outage plan. The equations for real power and reactive power representing the conservation of energy at bus 'i' with 'N' number of branches connected to bus 'i' are:

$$\sum_{j=1}^{N} Pij = 0$$

$$\sum_{j=1}^{N} Qij = 0$$

$$P_i = \sum_{j=1}^{N} |Y_{ij} V_i V_j| \cos(\theta_{ij} + \delta_j - \delta_i)$$

$$Q_i = -\sum_{j=1}^{N} |Y_{ij} V_i V_j| \sin(\theta_{ij} + \delta_j - \delta_i)$$

In the example equations above, P refers to active power, Q refers to reactive power, $V_i$ refers to Voltage Magnitude at Bus 'i', $\delta_i$ refers to Voltage Angle at Bus 'i', $Y_{ij}$ refers to Admittance magnitude between bus 'i' and bus 'j', and $\theta_{ij}$ refers to Admittance magnitude between bus 'i' and bus 'j'.

Large-scale outages in a power system network due to severe weather conditions may lead to formation of multiple electrical "islands." During these unintentional islanding scenarios, there could be an island(s) with island stability issues such as load-generation imbalance (loss of MW Control), voltage stability issues (loss of Voltage Regulation), etc. These islands can be safely de-energized or possible control actions may be taken to make such islands feasible. In the example embodiments, an island stability control module is provided that autogenerates a node-breaker based mitigation plan using the following control functions:

f: R1, R1∈ {$UN_1$, $LD_1$, $SVC_1$}
s.t. Pmin<P<Pmax, Qmin<Q<Qmax

In this example, R1 refers to a set of all existing online resources available to stabilize the island(s) such as power distribution equipment, $UN_1$ refers to a Group of Online Units available, $LD_1$ refers to a Group of Online Loads available, $SVC_1$ refers to a Group of Online Static Var Compensators like Capacitors, Reactors, etc. available. P is the current Output Active Power that lies within the minimum Pmin and maximum Pmax limit. Q is the current Output Reactive Power that lies within the minimum Qmin and maximum Qmax limit.

f: R2, R2∈ {$UN_2$, $LD_2$, $SVC_2$}

In this example, R2 refers to a set of Outaged Resources available to stabilize the island(s), $UN_2$ refers to a Group of Outaged Units available, $LD_2$ refers to a Group of Outaged Loads available, $SVC_2$ refers to a Group of Outaged Static Var Compensators like Capacitors, Reactors, etc. that are available.

f: R3, R3∈ {$UN_3$, $LD_3$}

In this example, R3 refers to a set of existing online resources to de-energize infeasible island(s), $UN_3$ refers to a Group of Existing Units available, and $LD_3$ refers to a Group of Existing Loads available.

Figure 5:
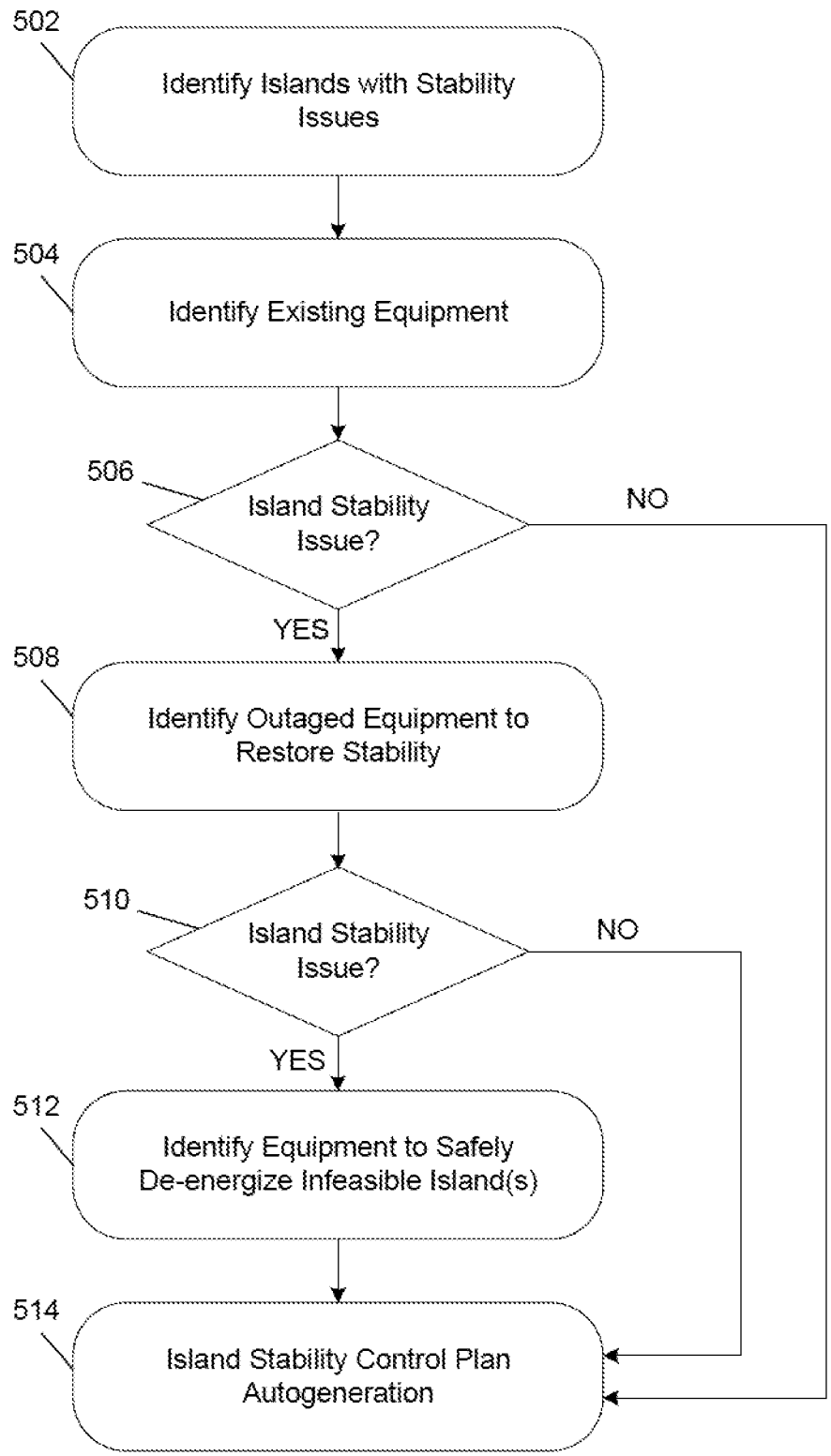
FIG. 5 is a diagram illustrating a process of performing weather-driven control of island(s) within the power grid to make island(s) feasible and stable in accordance with an example embodiment.

FIG. 5 illustrates a process 500 of performing weather-driven control of an island within the power grid in accordance with an example embodiment. Referring to FIG. 5, in 502, the host platform may perform a predictive analysis on the outage plan based on a current state of the power system or the like, and determine whether any islands with stability issues will be created by the outage plan. In 504, the system may identify any equipment included in the island and/or included independent of the island that could bring power to the island (e.g., if turned on, etc.) If an island stability issue is detected in 506, the system identifies already outaged equipment to restore the stability to the island in 508 and performs another simulation based on a modified outage plan using the outaged equipment like Units, Loads, SVCs, etc. to restore power to the island.

Another predictive analysis may be performed in 508, based on the updated outage plan. If the system detects that stability issues still exist in 510, the island can be de-energized instead. Here, in 512, the system may identify the equipment to power down the island in a most efficient and safest manner with respect to the system operating conditions and weather conditions.

A predictive steady state analysis (that may include predictive base case assessments and predictive contingency assessments) of the outage plan(s) can be performed in different ways. One of the ways to study the effect of outage plan(s) is to implement all the steps included in the outage plan(s) and then perform a predictive base case assessment and contingency assessment to identify violations (if any) due to these outages. An important point to note here is that, in real world scenario, all steps in the outage plan(s) will not be executed all at once. These steps will be executed in phases or milestones as defined by the user (dependent on severity and location of bad weather conditions).

Figure 6:
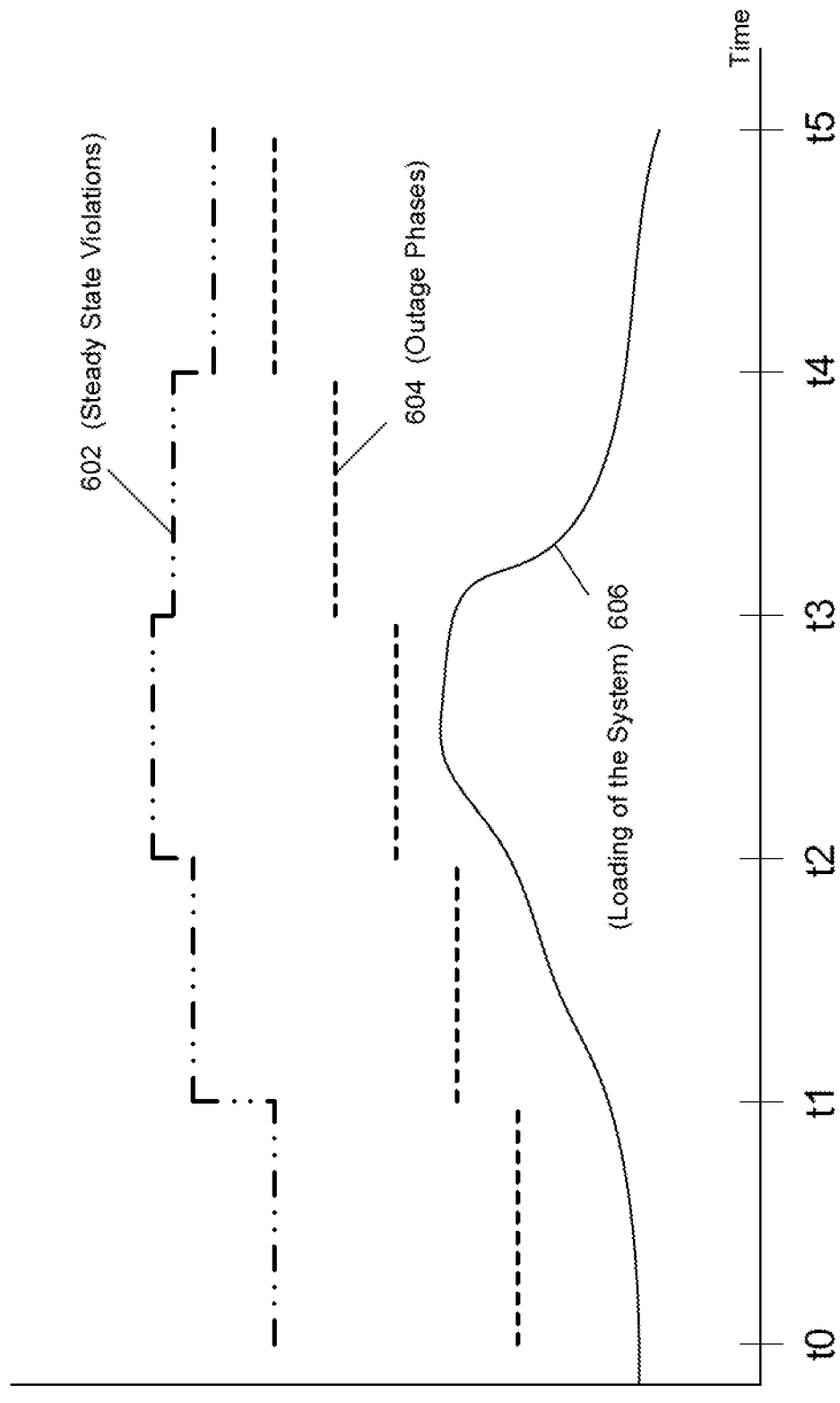
FIG. 6 is a diagram illustrating a graph of intermediate violations that may be masked in accordance with an example embodiment.

If an outage plan is studied all at once, then intermediate violations may be masked as shown in the graph 600 of FIG. 6. Here, a signal 602 represents intermediate violations at different steps or milestones (represented by signal 604) in the outage plan for a power system that includes a loading profile 606 of the power network. In contrast, in the example embodiments, a step-by-step or milestone-by-milestone analysis may be performed of an outage plan(s) to identify intermediate violations and generate control steps to mitigate these intermediate violations.

Figure 7:
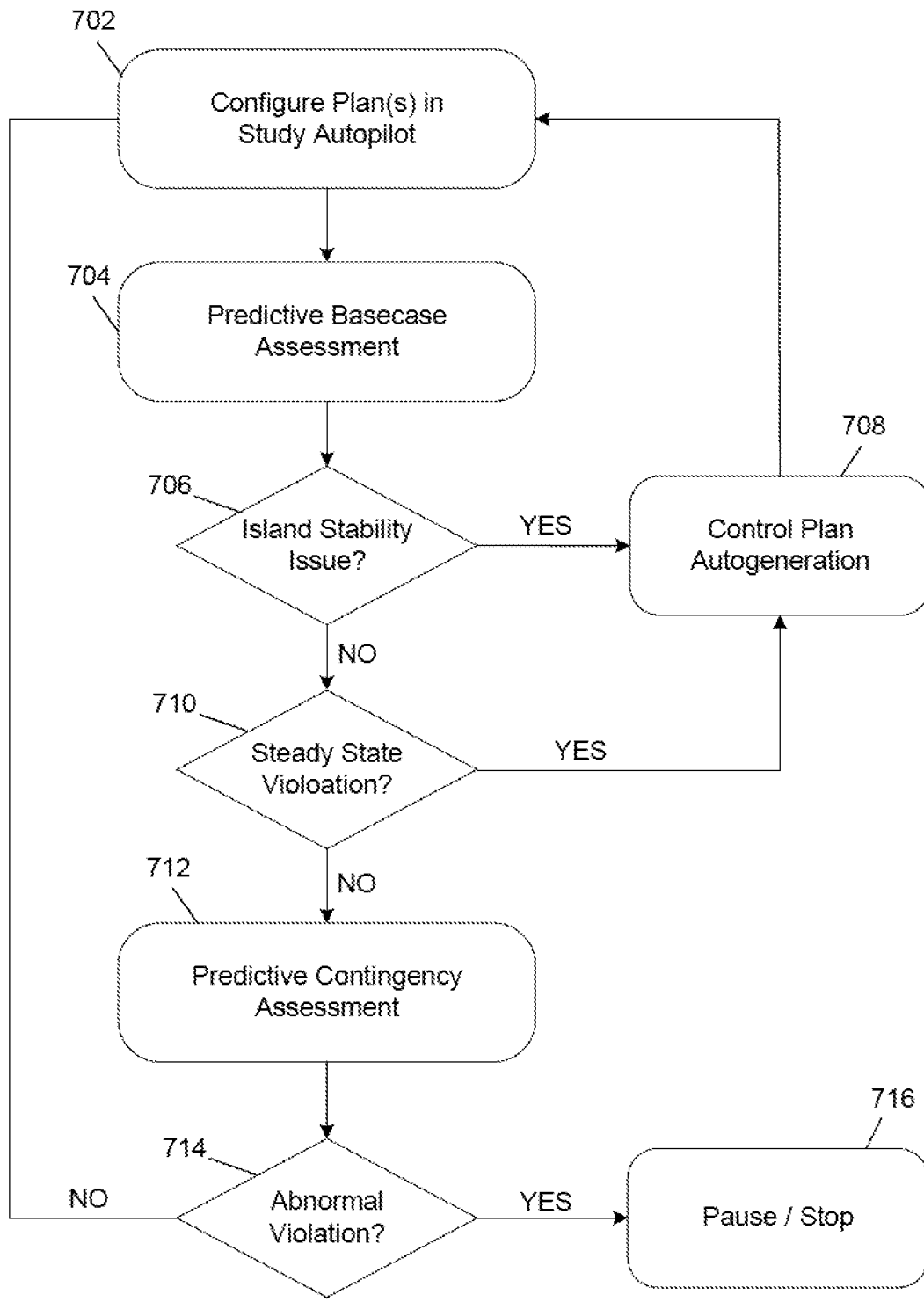
FIG. 7 is a diagram illustrating a process of automated incremental step-by-step or milestone-by-milestone based steady state assessment of outage plan(s) in accordance with example embodiments.

FIG. 7 illustrates a process of automated incremental step-by-step or milestone-by-milestone based steady state assessment of outage plan(s) in accordance with example embodiments. The process 700 may be executed by a an automated step-by-step or milestone-by-milestone analysis algorithm referred to herein as a 'Study Autopilot' which is a software program that can be executed on a power grid server, gateway, system, or the like, and can be used to perform such incremental predictive assessment and validate the sequence of steps in the outage plan(s). The Study Autopilot is a module of software used to perform an incremental (step-by-step or milestone-by-milestone) predictive steady state analysis of the network with the outage and/or mitigation plan(s) that includes both predictive base case assessment and predictive contingency assessment. After each step of the analysis, the module also autogenerates a detailed assessment report that could be used for training and/or compliance purposes. The Study Autopilot is capable of studying multiple Plans in parallel or in a sequential manner as defined by the user. The Study Autopilot may include various stages such as, but not limited to, a configuration stage, a predictive base case assessment stage, a predictive contingency assessment stage, a control plan auto-generation stage, and the like.

Referring to FIG. 7, in 702, the Study Autopilot configures the steps in any plan(s) that are to be assessed for predictive studies. The user has the capability to assign different priorities and milestones to plan(s) based on the predicted order of execution. In the 'Predictive Base case Assessment' Stage, in 704, the Study Autopilot performs predictive base case analysis to assess the predictive state of the system for the configured steps in the plan(s). For example, based on user-defined threshold limits, the Study Autopilot can identify if there any violations or island stability issues in the network.

If island instability issues are detected, in 706 the system performs an analysis to determine if the island can be sustained by using existing available resources (like generators, loads, static var compensators, etc.) or by using outaged resources or needs to be powered down due to infeasible power generation, supply, or the like. If the island can be made feasible or is to be shutdown, in 708, the system autogenerates an island stability plan for the island and adds it to the objects, constraints, criteria, etc. of the outage plan.

In 710, the Study Autopilot performs an analysis to determine if any violation is present. If a violation is detected, the Study Autopilot automatically autogenerates the necessary mitigation plan(s) required to mitigate the violation and adds them to the plans. This allows the operators to know the exact sequence of steps to follow during execution of outage plan(s) to avoid any unnecessary violations and/or island stability Issues.

In some embodiments, the Study Autopilot may perform a predictive contingency analysis to assess the predictive contingency state of the system for the configured steps in the plan(s). Based on user-defined threshold limits, the user can identify if there are any abnormal contingency violations in the network. In 712, an incremental predictive assessment of the steady state of the outage plan(s) may be performed to validate a dynamic assessment of the outage plans. This can be done using a mathematical algorithmic module referred to as a Real-time Autopilot. For dynamic validation of the outage and mitigation plans, in 714, a Realtime Autopilot may be run in the simulation mode. In the simulation mode of Realtime Autopilot, a power system dynamic simulation engine is connected to perform simulation in closed-loop manner. In 714, the island stability can be validated. If so, the outage plan is determined to be a success and the process stops or is paused in 716. The validation may include validating the steady-state state variables and the dynamic state variables. In this way, the Realtime Autopilot can be used to analyze the impact of plan(s) on the system frequency. If the steady state is validated in 714, the process stops or is paused in 716, otherwise the process is repeated if the steady state is not valid.

Figure 8:
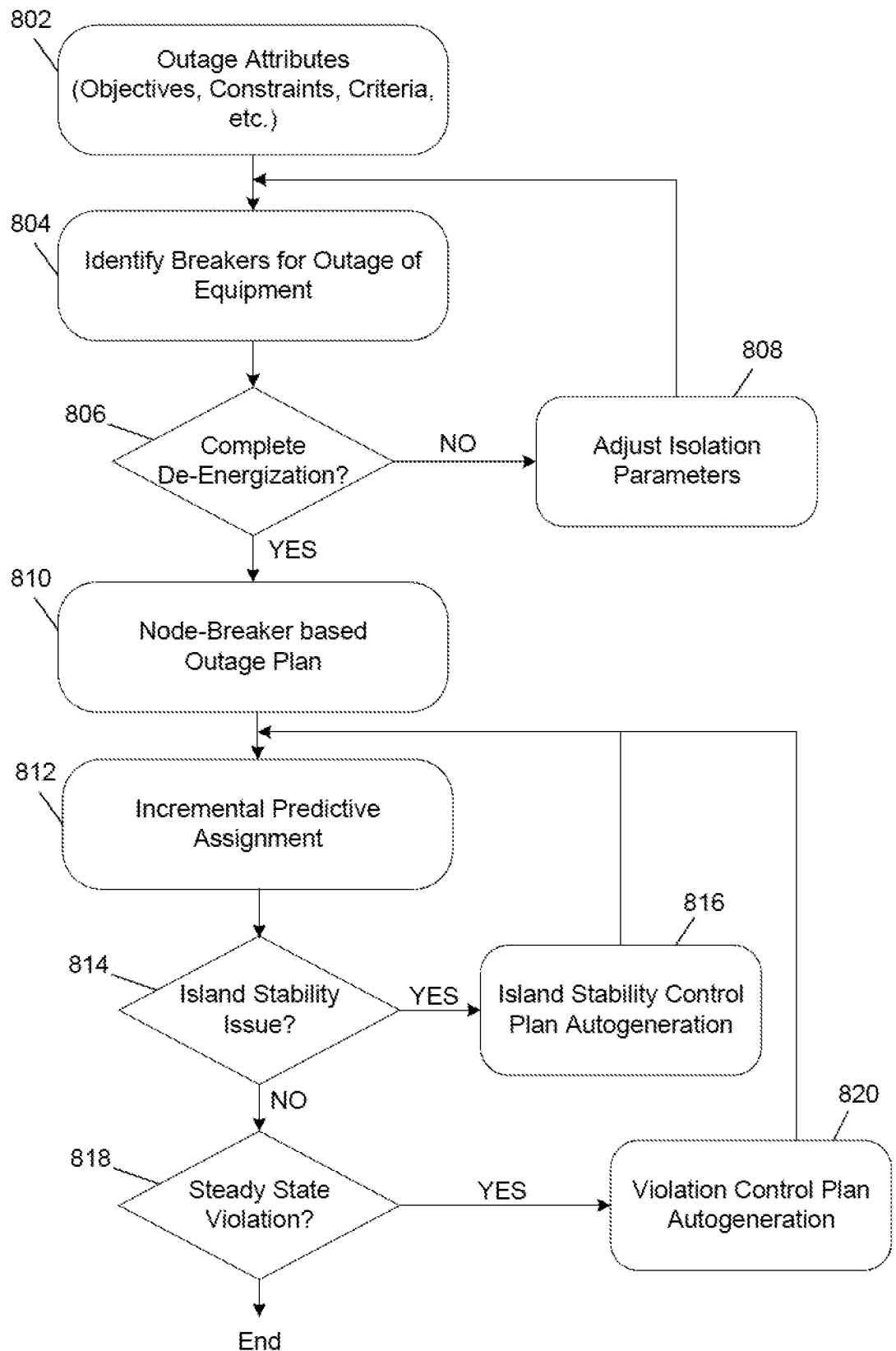
FIG. 8 is a diagram illustrating the overall outage management process that includes individual processes as mentioned in FIGS. 4, 5, 6, and 7.

FIG. 8 illustrates a process 800 of the overall Outage Management Process within the power grid in accordance with example embodiment. In FIG. 8, the user defines the Outage attributes like objective functions, constraints, criteria, etc in 802, and in 804, based on the defined Outage attributes, the module identifies breakers to de-energize the Equipment as per the list created based power grid operating conditions and weather conditions. In 806, it is checked if all the equipment are completed de-energized. If not, the Isolation parameters are adjusted in 808 and the process 804 and 806 are performed again. Once complete de-energization is ensured, a node-breaker based Outage Plan is auto-generated in 810. The processes 812, 814, 816, 818, and 820 form the Study Autopilot process 700 as described in FIG. 7. In 812, an incremental predictive assessment of the Outage plan(s) may be performed. In 814, the island stability is validated. If the process detects an island stability, an Island Stability Control Plan is autogenerated in 816. Once all the island stability issue(s) are fixed, the process 818 checks for any steady state violation in the power grid. If any violation exceeds the threshold limit set by the user, the process 820 autogenerates a mitigation plan to mitigate the violation in the power grid.

The next step after an incremental predictive steady state assessment of the Outage Plan(s) is to validate the Outage Plan(s) for dynamic assessment. This can be done using a novel mathematical algorithmic module called 'Realtime Autopilot'. For dynamic validation of the Outage and Mitigation Plans, the Realtime Autopilot is run in the Simulation Mode. In the Simulation Mode of Realtime Autopilot, a power system dynamic simulation engine is connected to perform simulation in closed-loop manner. In this process, along with the steady-state state variables, the dynamic state variables are also validated. In this way, the Realtime Autopilot can be used to analyze the impact of Plan(s) on the system frequency. The Realtime Autopilot module described herein includes various stages similar to the Study Autopilot. For example, the Realtime Autopilot may include configuration stage, a predictive base case assessment stage, a predictive contingency assessment stage, a control plan auto-generation stage, an execution stage, a validation stage, and the like.

In the configuration stage, the Realtime Autopilot configures the steps in plan(s) based on the priority and milestones defined by the user. In this stage, all the necessary steps are configured for further predictive analysis. In some embodiments, there is an additional island frequency-hold mode that configures the loads and generators to maintain the system frequency at desired frequency levels. In the predictive base case assessment stage, the configured steps from the previous stage are studied on the real-time network model fed from a realtime state estimator.

Based on user-defined threshold limits, the user can identify if there any violations or island stability issues in the network. In this stage, if there are any island stability issues or violations, the control plan auto-generation module is activated and it autogenerates the required node-breaker plan to mitigate Island Stability Issues or Violations. If any increase or decrease in load and generation is predicted in this stage, the Realtime Autopilot, activates the Frequency-Hold Mode which allows the Configuration stage to adjust loads and generations to maintain frequency at the desired levels set by the User. The frequency-hold mode may be represented by the following equation:

$$f_{min} < f_{sys} < f_{max}$$

In this example, $f_{sys}$ is the system Frequency in Hertz (Hz), $f_{min}$ is the minimum frequency threshold set by the User in Hertz (Hz), $f_{max}$ is the maximum frequency threshold set by the user in Hertz (Hz). In the execution stage, the configured steps are executed in the power system dynamic simulation engine in a closed-loop manner. In this way, the steps that are studied in the predictive assessment stage are implemented in the network with system dynamics taken into account. In the validation stage, the executed steps are validated with the realtime state estimator results. After this, the actual violations are compared with the predicted violations to check if they are within the user-specified range of predicted violations.

Once, the dynamic validation of plan(s) are completed, the plan(s) are ready to be executed in the actual field. The Plan(s) can be executed in the real world using the Realtime Autopilot in SCADA mode. In the SCADA mode of operation of Realtime Autopilot, the SCADA forms the interconnection between the Energy Management System and real-world power system network.

Figure 9A:
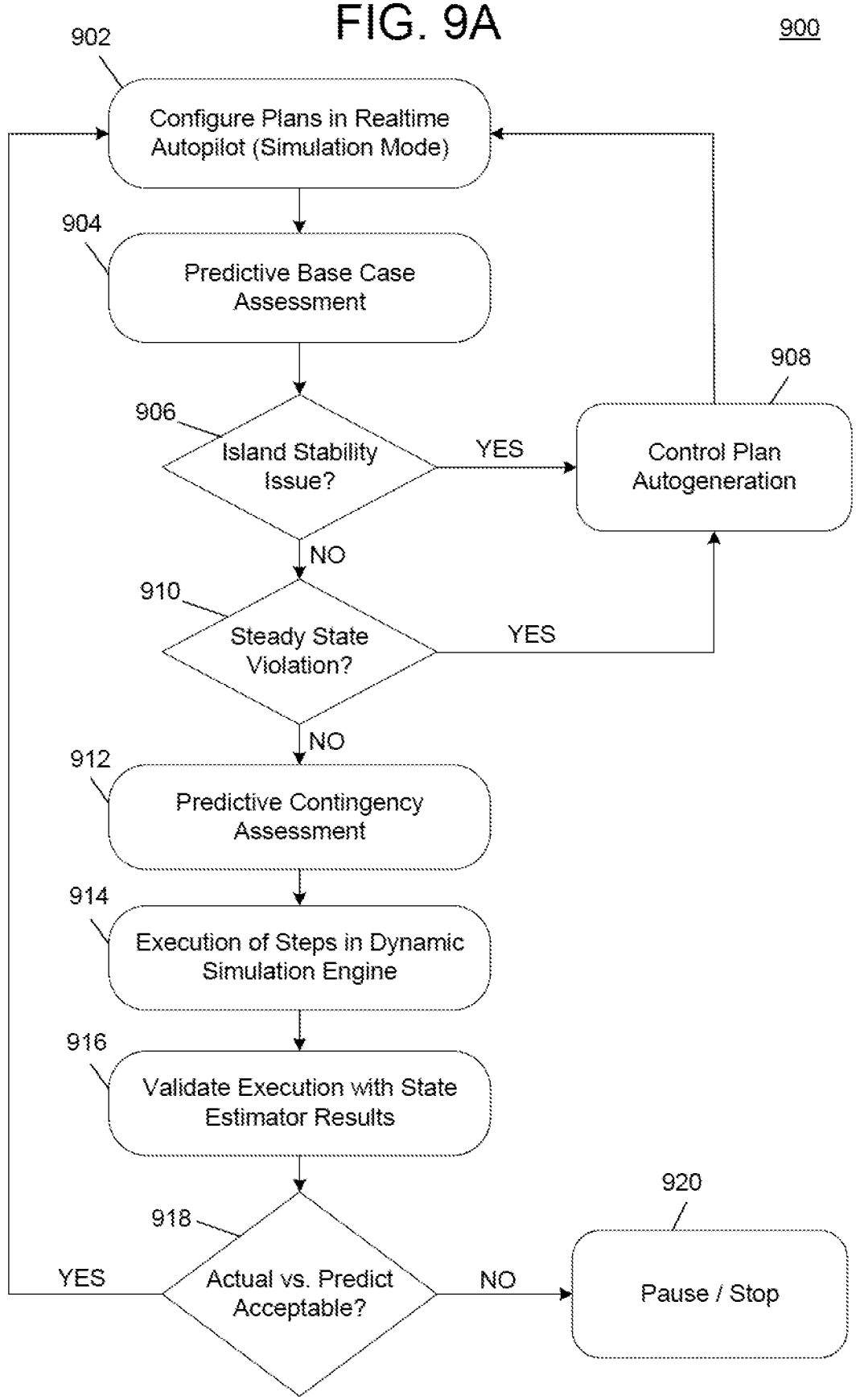
FIGS. 9A and 9B are diagrams illustrating processes of dynamic validation and execution of outage plan(s) using SCADA controls in accordance with example embodiments.
Figure 9B:
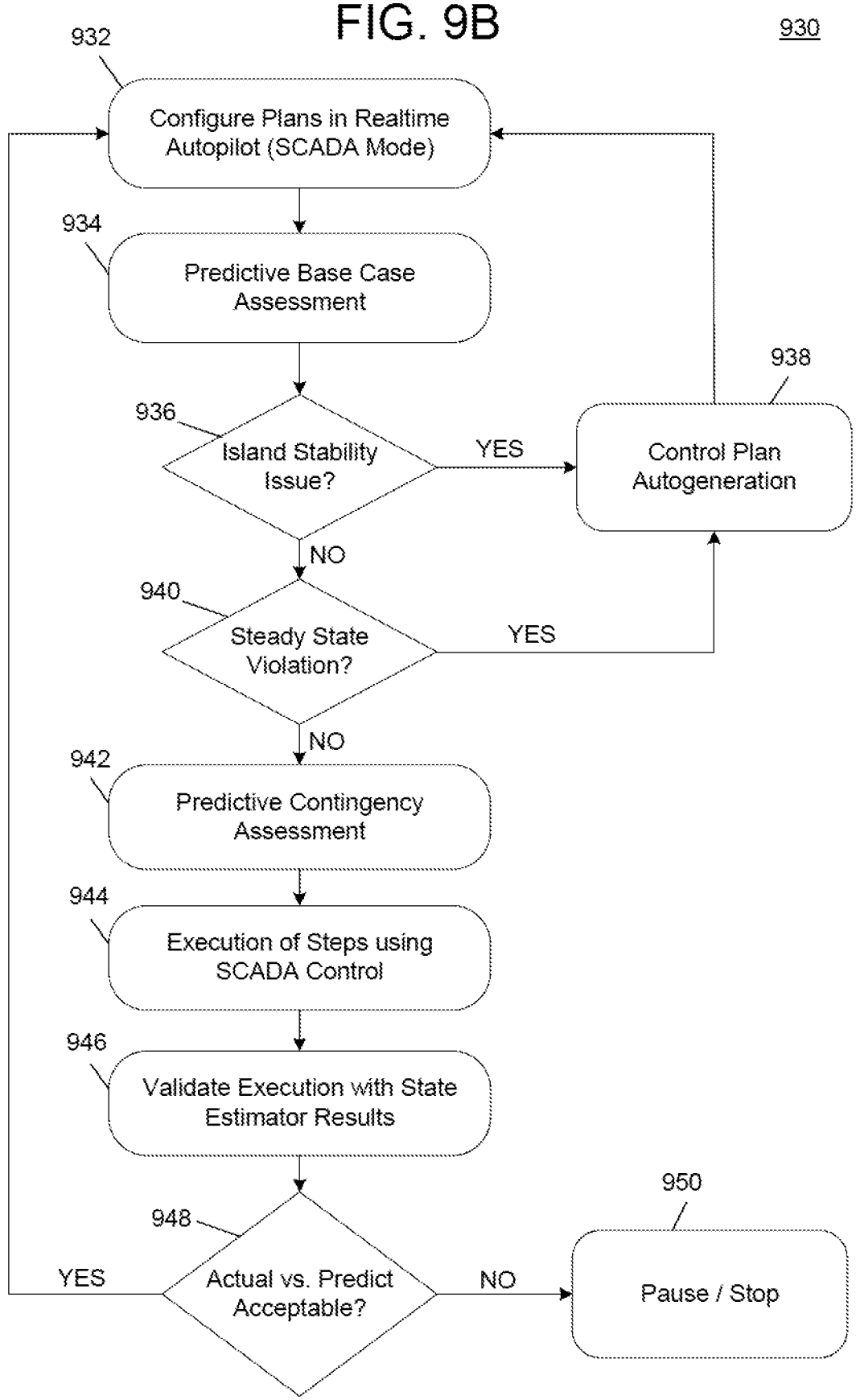

FIGS. 9A and 9B illustrate examples of dynamic validation and execution of Outage Plan(s) in accordance with example embodiments.

In particular, FIG. 9A illustrates a process 900 in which the Realtime Autopilot validates an outage plan while in a simulation mode (i.e., while simulating the outage plan in a closed loop with Dynamic Simulation Engine, etc.) In 902, the plan is configured, and in 904 a base case assessment is performed via a steady state simulation. In 906, the simulation results are analyzed for island stability and in 910 the simulation results are analyzed for steady state violations. If any island issues or steady state violation issues are detected, they can be added to the outage plan in 908 via an autogenerated plan instruction(s).

In 912, a predictive contingency assessment of a steady state of the outage plan(s) may be performed to validate the dynamically created outage plan for an island(s). In 914, the outage plan can be simulated via a dynamic simulation engine stability of the system can be validated again by a state estimator in 916. In 918, the system may perform the comparison between the actual violations (e.g., from state estimation solution) and the predicted violations. If actual and predicted violations are far off and beyond user-defined threshold, the Realtime Autopilot may pause or stop for human intervention before it moves to configure the next set of steps in Plan(s).

Meanwhile, FIG. 9B also illustrates a process 930 in which the Realtime Autopilot validates and executes an outage plan, but in this time, the Realtime Autopilot is in a SCADA mode. In 932, the plan is configured, and in 934 a base case assessment is performed via a steady state simulation. In 936, the simulation results are analyzed for island stability and in 940 the simulation results are analyzed for steady state violations. If any island issues or steady state issues are detected, they can be added to the outage plan in 938 via an autogenerated plan instruction(s).

In 942, a predictive contingency assessment of a steady state of the outage plan(s) may be performed to validate the dynamically created outage plan for an island(s). In 944, the outage plan can be executed via a SCADA control system and stability of the system can be validated again by a state estimator in 946. In 948, the system may perform the comparison between the actual violations (e.g., from state estimation solution) and the predicted violations. If actual and predicted violations are far off and beyond user-defined threshold, the Realtime Autopilot may pause or stop for human intervention before it moves to configure the next set of steps in Plan(s).

Figure 11:
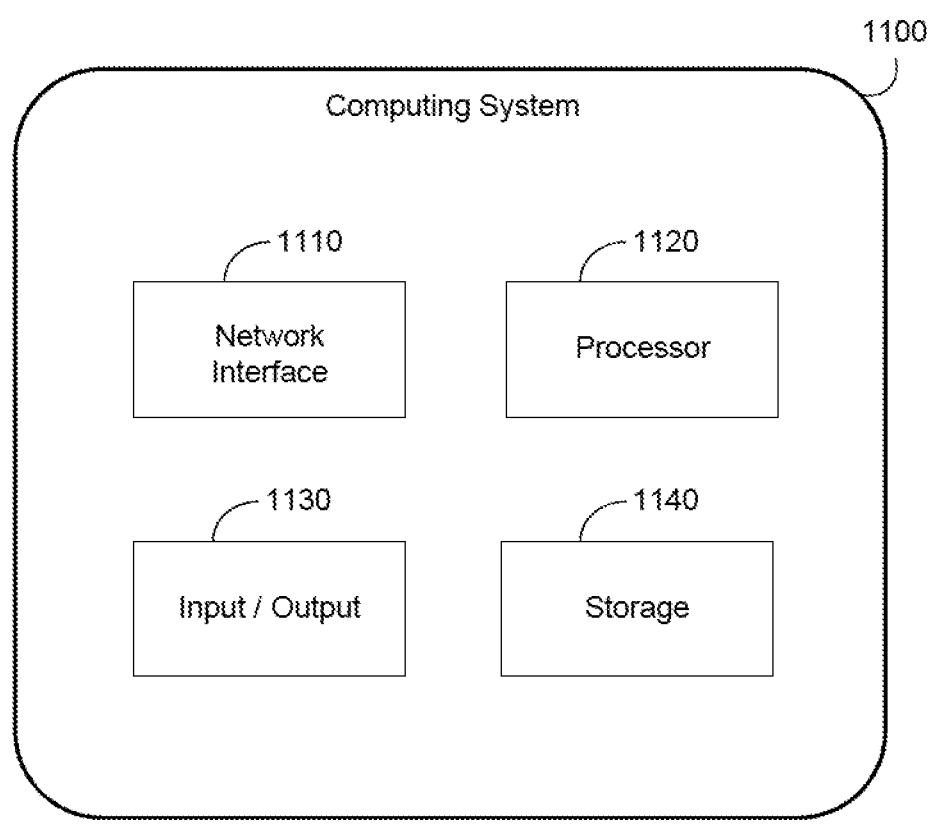
FIG. 11 is a diagram illustrating a computing system for use in the examples herein in accordance with an example embodiment.

FIG. 10 illustrates a method 1000 of a partitioning a state estimation process in accordance with an example embodiment. For example, the method 1000 may be performed by a computing system such as shown in FIG. 11. The computing system may include a web server, a cloud platform, a control center, a personal computer, a mobile device, or the like. Referring to FIG. 10, in 1010, the method may include receiving operational state data from a power grid and current weather conditions associated with the power grid. The operational state data may include the current steady-state and dynamic state conditions on the power grid. The current weather conditions may include features such as wind direction, wind speed, temperature, geospatial data identifying the locations of the weather-driven event, etc.

In 1020, the method may include identifying one or more nodes on the power grid to de-energize based on the operational state data and the current weather conditions. In 1030, the method may include determining a sequence of instructions to perform to de-energize the one or more identified nodes based on the operational state data and the current weather conditions associated with the power grid. In 1040, the method may include generating an outage plan for the power grid which includes the determined sequence of instructions to be executed and store the outage plan in the memory.

In some embodiments, the method may further include storing a geospatial representation of critical equipment on the power grid, wherein the identifying comprises identifying the one or more equipment on the power grid to de-energize based on the geospatial representation of the critical equipment on the power grid geospatial data of the current weather conditions. In some embodiments, the identifying may include identifying the one or more nodes on the power grid based on one or more of wind speed, wind direction, and temperature included in the current weather conditions. In some embodiments, the identifying may include identifying a subset of circuit breakers on the power grid that can be operated automatically from a control center as the one or more nodes on the power grid to de-energize. In some embodiments, the identifying may include identifying a subset of circuit breakers on the power grid based on their availability based on SCADA Tagging, crew inspection, etc.

In some embodiments, the method may further include simulating the outage plan against a threshold power system model via execution of a simulation engine and validating the determined sequence of instructions within the outage plan based on the simulation of the outage plan. In some embodiments, the method may further include identifying an instruction within the outage plan that will create instability and/or system violations in the power grid based on the simulation, generating a mitigation plan for mitigating the instability and/or system violations, and adding instructions for the mitigation plan to the outage plan stored in memory. In some embodiments, the method may further include executing the outage plan and automatically de-energizing the one or more nodes on the power grid based on the determined sequence of instructions in the outage plan.

FIG. 11 illustrates a computing system 1100 that may be used in any of the methods and processes described herein, in accordance with an example embodiment. For example, the computing system 1100 may be a database node, a server, a cloud platform, or the like. In some embodiments, the computing system 1100 may be distributed across multiple computing devices such as multiple database nodes. Referring to FIG. 11, the computing system 1100 includes a network interface 1110, a processor 1120, an input/output 1130, and a storage device 1140 such as an in-memory storage, and the like. Although not shown in FIG. 11, the computing system 1100 may also include or be electronically connected to other components such as a display, an input unit(s), a receiver, a transmitter, a persistent disk, and the like. The processor 1120 may control the other components of the computing system 1100.

The network interface 1110 may transmit and receive data over a network such as the Internet, a private network, a public network, an enterprise network, and the like. The network interface 1110 may be a wireless interface, a wired interface, or a combination thereof. The processor 1120 may include one or more processing devices each including one or more processing cores. In some examples, the processor 1120 is a multicore processor or a plurality of multicore processors. Also, the processor 1120 may be fixed or it may be reconfigurable. The input/output 1130 may include an interface, a port, a cable, a bus, a board, a wire, and the like, for inputting and outputting data to and from the computing system 1100. For example, data may be output to an embedded display of the computing system 1100, an externally connected display, a display connected to the cloud, another device, and the like. The network interface 1110, the input/output 1130, the storage 1140, or a combination thereof, may interact with applications executing on other devices.

The storage device 1140 is not limited to a particular storage device and may include any known memory device such as RAM, ROM, hard disk, and the like, and may or may not be included within a database system, a cloud environment, a web server, or the like. The storage 1140 may store software modules or other instructions which can be executed by the processor 1120 to perform the method shown in FIG. 10. According to various embodiments, the storage 1140 may include a data store having a plurality of tables, records, partitions and sub-partitions. The storage 1140 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a memory;
   a network interface configured to receive operational state data from a power grid and current weather conditions associated with the power grid; and
   a processor configured to
      identify one or more nodes on the power grid de-energize based on a predicted or current operational power system state data and the weather conditions,
      determine a sequence of instructions to perform to de-energize the one or more identified nodes based on the operational state data and the current weather conditions associated with the power grid,
      generate a first outage plan for the power grid which includes the determined sequence of instructions to be executed and store the first outage plan in the memory;
      predict at least one instruction of the sequence of instructions included in the first outage plan will create an instability issue; and
      generate a second outage plan for the power grid including one or more additional instructions based on the predicted at least one instruction to create the instability issue.

2. The computing system of claim 1, wherein the memory is configured to store a geospatial representation of critical equipment on the power grid, and the processor is further configured to identify the one or more nodes on the power grid to de-energize based on the geospatial representation of the critical equipment on the power grid and geospatial data of the predicted or current weather conditions.

3. The computing system of claim 1, wherein the processor is configured to identify the one or more nodes on the power grid based on one or more of wind speed, wind direction, and temperature included in the predicted or current weather conditions.

4. The computing system of claim 1, wherein the processor is further configured to identify a subset of circuit breakers on the power grid that can be operated automatically from a control center as the one or more nodes on the power grid to de-energize based on equipment availability based on at least one of SCADA tagging information, and crew inspection inputs, etc.

5. The computing system of claim 1, wherein the processor is configured to simulate the first outage plan against a threshold power system model via a simulation engine and validate the determined sequence of instructions within the first outage plan based on the simulation of the first outage plan.

6. The computing system of claim 5, wherein the processor is configured to identify an instruction within the first outage plan that will create system violations in the power grid based on the simulation, generate a mitigation plan for mitigating the system violations, and add instructions for the mitigation plan to the first outage plan stored in memory to generate the second outage plan.

7. The computing system of claim 1, wherein the processor is configured to execute the second outage plan and automatically de-energize the one or more nodes on the power grid based on the determined sequence of instructions in the second outage plan.

8. The computing system of claim 1, wherein the processor is further configured to determine a sequence of instructions to mitigate an instability issue comprising one or more of a load-generation imbalance, a voltage instability, and a system violation, based on the operational state data of the power grid, and add the sequence of instructions to the first outage plan to generate the second outage plan.

9. The computing system of claim 8, wherein the processor is further configured to validate the sequence of instructions with an automated steady-state and dynamic assessment.

10. The computing system of claim 1, wherein the processor is further configured to execute the second outage plan with a Supervisory Control and Data Acquisition (SCADA) system based on real-time conditions of the power grid.

11. A method comprising:
receiving operational state data from a power grid and current weather conditions associated with the power grid;
identifying one or more nodes on the power grid to de-energize based on the operational state data and the current weather conditions;
determining a sequence of instructions to perform to de-energize the one or more identified nodes based on a predicted or current operational power system state data and the weather conditions associated with the power grid;
generating a first outage plan for the power grid which includes the determined sequence of instructions to be executed and store the first outage plan in memory;
predicting at least one instruction of the sequence of instructions included in the first outage plan will create an instability issue; and
generating a second outage plan for the power grid including one or more additional instructions based on the predicted at least one instruction to create the instability issue.

12. The method of claim 11, wherein the method further comprises storing a geospatial representation of critical loads on the power grid, wherein the identifying comprises identifying the one or more nodes on the power grid to de-energize based on the geospatial representation of critical equipment on the power grid and geospatial data of the predicted or current weather conditions.

13. The method of claim 11, wherein the identifying comprises identifying the one or more nodes on the power grid based on one or more of wind speed, wind direction, and temperature included in the predicted or current weather conditions.

14. The method of claim 11, wherein the identifying comprises identifying a subset of circuit breakers on the power grid that can be shut down automatically from a control center as the one or more nodes on the power grid to de-energize based on equipment availability based on at least one of SCADA tagging information, and crew inspection inputs.

15. The method of claim 11, wherein the method further comprises simulating the first outage plan against a threshold power system model via execution of a simulation engine and validating the determined sequence of instructions within the first outage plan based on the simulation of the first outage plan.

16. The method of claim 15, wherein the method further comprises identifying an instruction within the first outage plan that will create instability in the power grid based on the simulation, generating a mitigation plan for mitigating the instability, and adding instructions for the mitigation plan to the first outage plan stored in memory to generate the second outage plan.

17. The method of claim 11, wherein the method further comprises executing the second outage plan and automatically shutting down the one or more nodes on the power grid based on the determined sequence of instructions in the second outage plan.

18. The method of claim 11, wherein the method further comprises determining a sequence of instructions to mitigate an instability issue comprising one or more of a load-generation imbalance, a voltage instability, and a system violation, based on the operational state data of the power grid, and adding the sequence of instructions to the first outage plan to generate the second outage plan.

19. The method of claim 11, wherein the method further comprises executing the second outage plan with a Supervisory Control and Data Acquisition (SCADA) system based on real-time conditions of the power grid.

20. A non-transitory computer-readable storage medium comprising instructions which when executed by a processor cause a computer to perform a method comprising:
receiving operational state data from a power grid and current weather conditions associated with the power grid;
identifying one or more nodes on the power grid to de-energize based on a predicted or current operational power system state data and the weather conditions;
determining a sequence of instructions to perform to de-energize the one or more identified nodes based on the predicted or current operational power system state data and the weather conditions associated with the power grid;
generating a first outage plan for the power grid which includes the determined sequence of instructions to be executed and store the first outage plan in memory;
predicting at least one instruction of the sequence of instructions included in the first outage plan will create an instability issue; and
generate a second outage plan for the power grid including one or more additional instructions based on the predicted at least one instruction to create the instability issue.

* * * * *